United States Patent [19]

Buch

[11] Patent Number: 5,230,067
[45] Date of Patent: Jul. 20, 1993

[54] BUS CONTROL CIRCUIT FOR LATCHING AND MAINTAINING DATA INDEPENDENTLY OF TIMING EVENT ON THE BUS UNTIL NEW DATA IS DRIVEN ONTO

[75] Inventor: Bruce D. Buch, Westborough, Mass.

[73] Assignee: Digital Equipment Corporation, Maynard, Mass.

[21] Appl. No.: 506,583

[22] Filed: Apr. 9, 1990

Related U.S. Application Data

[63] Continuation of Ser. No. 192,778, May 11, 1988, abandoned.

[51] Int. Cl.⁵ .............................................. G06F 13/36
[52] U.S. Cl. ........................ 395/275; 364/DIG. 2; 364/926.91; 364/927.92; 364/935.41; 364/935.42; 364/242.91; 364/DIG. 1; 395/250; 370/85.1
[58] Field of Search ... 364/200 MS File, 900 MS File; 395/250, 725, 275, 800

[56] References Cited

U.S. PATENT DOCUMENTS

| | | | |
|---|---|---|---|
| 3,938,098 | 2/1976 | Garlic | 364/200 |
| 3,996,564 | 12/1976 | Kerrigan et al. | 395/275 |
| 4,060,794 | 11/1977 | Feldman et al. | 364/900 |
| 4,075,606 | 2/1978 | Wilkens | 375/36 |
| 4,122,520 | 10/1978 | Adamchick et al. | 364/200 |
| 4,236,087 | 11/1980 | Kaminski | 307/296.1 |
| 4,368,461 | 1/1983 | Komatsu et al. | 340/703 |
| 4,377,843 | 3/1983 | Garringer | 395/275 |
| 4,387,294 | 6/1983 | Nakamura et al. | 377/712 |
| 4,407,016 | 9/1983 | Bayliss et al. | 395/275 |
| 4,417,304 | 11/1983 | Dinwiddie | 364/200 |
| 4,437,158 | 3/1984 | Alfke | 364/200 |
| 4,447,878 | 5/1984 | Kinnie | 364/200 |
| 4,450,370 | 5/1984 | Davis | 307/475 |
| 4,454,591 | 6/1984 | Lou | 364/900 |
| 4,462,084 | 7/1984 | Greenwood | 364/900 |
| 4,493,021 | 1/1985 | Agrawal et al. | 364/200 |
| 4,500,988 | 2/1985 | Bennett | 375/36 |
| 4,514,808 | 4/1985 | Murayama | 364/200 |
| 4,523,274 | 6/1985 | Fukunaga | 364/200 |
| 4,590,556 | 5/1986 | Berger et al. | 364/200 |
| 4,591,975 | 5/1986 | Wade | 364/200 |
| 4,683,534 | 7/1987 | Tietjen | 364/200 |
| 4,685,082 | 8/1987 | Cheung et al. | 365/49 |
| 4,701,841 | 10/1987 | Goodrich et al. | 364/200 |
| 4,724,531 | 2/1988 | Angleton | 365/189 |
| 4,756,006 | 7/1988 | Rickard | 307/480 |
| 4,766,334 | 8/1988 | Warner | 307/540 |
| 4,779,190 | 10/1988 | O'Dell et al. | 395/500 |
| 4,803,621 | 2/1989 | Kelly | 395/400 |
| 4,821,170 | 4/1989 | Bernick et al. | 364/200 |
| 4,831,520 | 5/1989 | Rubinfeld | 364/200 |
| 4,833,349 | 5/1989 | Liu | 307/468 |
| 4,860,198 | 8/1989 | Takenaka et al. | 364/200 |
| 4,860,200 | 8/1989 | Holmbo | 395/725 |
| 4,884,191 | 11/1989 | Weatherford et al. | 395/425 |
| 4,901,224 | 2/1990 | Ewert | 395/250 |
| 4,908,749 | 3/1990 | Marshall et al. | 395/325 |
| 4,918,589 | 4/1990 | Floro et al. | 364/132 |
| 5,040,109 | 8/1991 | Bowhill et al. | 395/325 |
| 5,047,922 | 9/1991 | Borkar | 395/275 |
| 5,113,369 | 5/1992 | Kinoshita | 395/325 |
| 5,138,310 | 8/1992 | Hirane et al. | 340/811 |

FOREIGN PATENT DOCUMENTS 0292625 11/1988 European Pat. Off. .

Primary Examiner—Thomas C. Lee
Assistant Examiner—Krisna Lim
Attorney, Agent, or Firm—Arnold, White & Durkee

[57] ABSTRACT

In a means and method for optimizing bus utilization with traditional computer system components, one or more latch circuits are coupled to a computer data bus. The latch circuits latch data states on the data bus after the bus has been driven to a desired state by a system driver node. Tri-state drivers are preferred. Once a data state has been latched, the associated driver may be disabled without affecting the data state on the bus. The data state may then be sampled at any time, and the integrity of the data state is preserved, until a new data state is driven onto the bus by a driver node. The latch circuit parameters allow any system driver to readily overcome the latch action, yet preserve the driven data state as logically valid until it is overwritten. Data sampling from the bus is restricted solely during driver enable periods. Bus utilization is optimized without undue sacrifices in system power requirements.

3 Claims, 2 Drawing Sheets

BUS CONTROL CIRCUIT FOR LATCHING AND MAINTAINING DATA INDEPENDENTLY OF TIMING EVENT ON THE BUS UNTIL NEW DATA IS DRIVEN ONTO

This application is a continuation of application Ser. No. 07/192,778, filed May 11, 1988 now abandoned.

BACKGROUND OF THE INVENTION

The present invention relates generally to the computer art. More particularly, the present invention pertains to the manipulation and transfer of data in a computer system. Specifically, the present invention relates to an improvement in data bus architecture, including a means and method for latching data states on a data bus to optimize bus utilization.

Generally, a bus comprises a grouping of signals, a communication link between one or more computer components and an associated communication (usage) protocol. The rate at which data can be transferred over the bus from one component to another has a direct effect on the operating speed for the overall computer system. Accordingly, bus utilization schemes or techniques seek to optimize the percentage of bus time which can be used for data transfer.

The various components of the computer system which are connected to the data bus are generally referred to as nodes. These nodes typically are characterized as either driving nodes or receiving nodes or both and typically comprise large scale integrated circuits or chips. Those nodes that act as drivers actively drive data onto the bus by forcing each line in the bus to assume a particular data state. Those nodes that act as receivers sample data from the bus after it has bee driven to a particular state by a driver node. Communication between selected ones of the nodes in the computer system is accomplished under control of the bus protocol, which specifies the time-multipexing of data on the bus.

Baseband buses generally prohibit the driving of data onto the bus by more than one driver at a time. At least two reasons exist for this prohibition, namely, (1) simultaneously driving two or more data states onto the bus creates an indeterminate data state on the bus, which precludes the accurate transfer of any data state when the bus is then sampled by the receiving nodes, and (2) some types of drivers create electrically harmful or dangerous conditions if driven simultaneously on the same bus, such as noise, signal spikes and short circuits.

Typical systems now operate under this constraint in various ways to attempt to optimize data transfer rates and bus utilization. One well known scheme employs tri-state drivers and separate timing events to disable and enable successive driver nodes. Tri-state drivers create power transients which are harmful to the computer system at large when drivers connected to the same line simultaneously attempt to drive that line to conflicting states. Accordingly, one driver must be completely disabled before the succeeding driver is enabled. During the time period required for disabling one driver and enabling the next driver no data may be sampled from the data bus. Accordingly, this represents down time for the bus and reduces the bus utilization. This results in a reduction in data bandwidth, i.e., the amount of information transmitted per unit time, for the computer system. This shortcoming exists, even in light of significant advances in overall system timing, as the time required for driver enabling and disabling has not been reduced in proportion to the reduction in data transfer times afforded through other advances.

An alternative method for data transfer uses open terminal drivers. These open terminal devices drive the data bus lines to only a single state. The other state is provided through a static resistor which holds the data bus line in a particular state unless driven to an opposing state by a driver. Open terminal drivers may simultaneously drive a given bus line because all the active drivers are trying to drive the bus to the same state and the only opposing force is the relatively weaker resistor trying to drive the bus to the opposite state. In addition, no more current flows through the resistor when several devices are enabled than when only one driver is enabled. This method thus allows the overlap of the disable time for a first driver with the enable time for a second, succeeding driver.

However, the simple switch to the open-terminal driver configuration does not necessarily optimize bus utilization. The resistance used to pull non-driven bus lines to the opposing logic state presents a trade-off between bus power and bus speed. High impedance resistors provide for low power consumption, but restrict bus bandwidth. To obtain sufficiently high system bandwidth, these resistors must be low impedance to provide short signal transitions and readily overcome the capacitance of the bus and its nodes. However, lowering the impedance of these resistors increases the current drive required of the bus drivers and increases the power which must be dissipated by these resistors when the corresponding bus line is driven.

Accordingly, current techniques for data bus transfer control provide an undesirable or unattractive trade-off between system power requirements and data bus utilization. Tri-state drivers provide low power data transfer, but require unsatisfactory driver hand-off time (the time required for one driver to disable and another driver to enable for data transfer); open terminal drivers allow the enable and disable times for successive drivers to overlap, thus reducing inefficient hand-off time and increasing bus utilization, but increase the power requirements for the system—an increase which can represent unacceptable operating performance.

SUMMARY OF THE INVENTION

The present invention seeks to overcome the deficiencies of the currently available schemes through an improved data bus control means and method which optimizes bus utilization rates, without unduly increasing system power requirements. The data bus control of the present invention captures the advantages of the various currently available methods, without incorporating the deficiencies of those methods.

A specific application of the present invention lies in the provision of data bus control in which tri-state drivers provide data to the data bus without restricting the data bus utilization rate. More specifically, the present invention provides for data bus control which latches each is driven onto the bus. This, in turn, provides a data bus control technique which allows a driving node to be disabled while preserving the integrity of the data currently existing on the bus to allow sampling of the data.

The advantages of the present invention may be had by use of the following disclosed preferred embodiment. The present invention and the preferred embodiment allow sampling of data from the data bus at any time after a driving node drives data onto the bus and the data is latched onto the bus and before another driving node begins to drive data onto the bus. The sampling occurs even after the driving node is disabled. By permitting the overlap of disabling and sampling periods, the present invention optimizes the data bus utilization rates and the power consumption needs for the computer system. The present invention uses a latching technique for latching data on a bus after a driver node has driven the data onto the bus and maintaining that data state on the bus until another driver drives a different data state onto the bus. Latching may be accomplished through any acceptable latching technique, including the provision of a separate latch circuit for each data line on the bus.

BRIEF DESCRIPTION OF THE DRAWINGS

The claims set forth the scope of the present invention with particularity. However, the invention, and advantages thereof, may be best understood by reference to the following detailed description of a preferred embodiment taken in conjunction with the accompanying drawings, in which like reference characters identify like elements, and of which:

DESCRIPTION OF A PREFERRED EMBODIMENT

Generally, a preferred embodiment of the present invention provides a latch circuit in association with a data bus in a computer system. The latch circuit maintains a data state on the bus until a subsequent data state or vector is driven onto the bus. Data sampling may take place at any time after the data vector is fully driven onto the bus, regardless of whether the driving node is still enabled, until such time as another node begins driving a new data state onto the bus. The preferred embodiment envisions the use of a separate latch circuit for each data line in the data bus. However, it is within the scope of the present invention to provide a latch circuit which controls more than one data line in the data bus.

Figure 1:
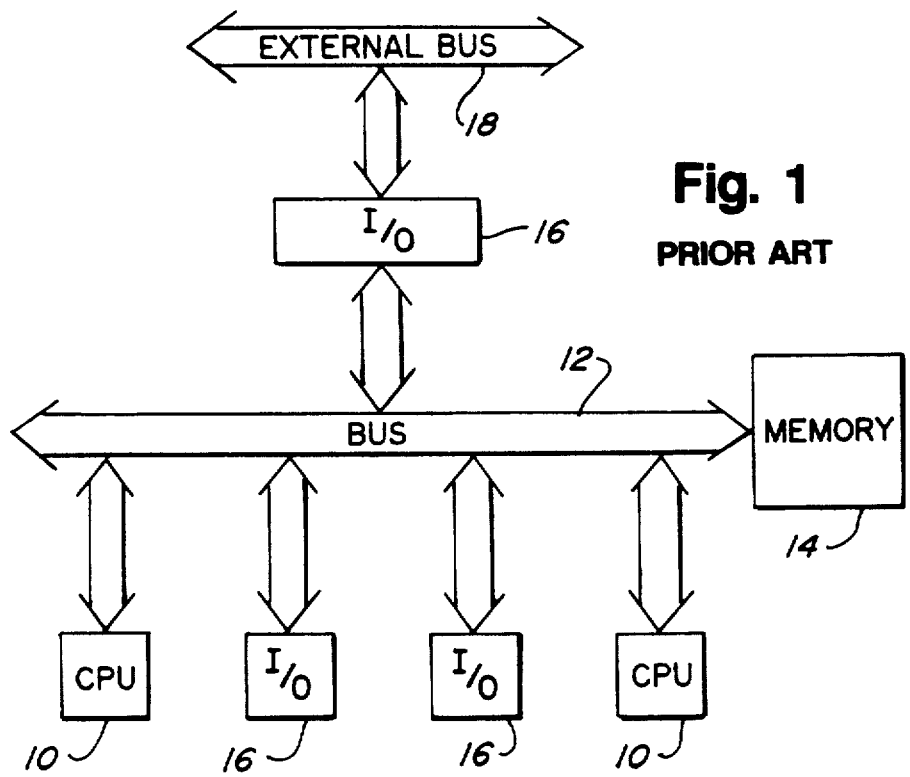
FIG. 1 illustrates a general schematic of a computer system for use with the present invention.

Referring now to the drawings, FIG. 1 illustrates a general computer system in a schematic fashion. The present invention may be put to ready use in systems such as that illustrated in FIG. 1. As shown, CPU units 10 communicate with a bus 12, which in turn communicates with memory, shown generally as memory unit 14, input/output devices, shown generally as I/O devices 16, and other bus networks, shown generally as an external bus 18. It should be appreciated that the system components shown generally in FIG. 1 may comprise any typical components used commonly with data buses, such as that shown as bus 12, in computer systems. For example, I/O devices 16 may be display terminals, printers, modems or other input/output devices. Likewise, the external bus 18 may be an Ethernet bus operating under suitable control (bus controller not shown). Accordingly, the system of FIG. 1 is shown solely by way of example.

As mentioned previously, the use of tri-state drivers typically requires the use of separate timing signals to initiate and terminate the enable periods for successively communicating drivers to avoid the various problems associated with simultaneous driving of the data bus. The timing of a typical data bus communication transaction using tri-state drivers is illustrated in FIG. 2.

Figure 2:
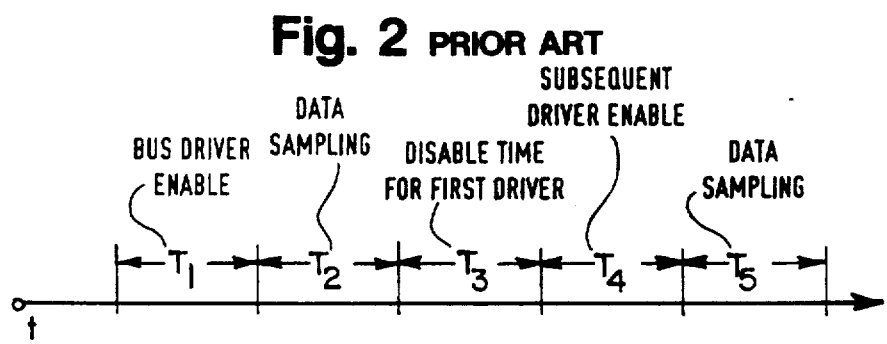
FIG. 2 illustrates the timing associated with one data bus control technique using tri-state drivers.

In FIG. 2, time is shown on the horizontal axis, advancing from left to right. The period denoted as T1 represents a period of time required for a bus driver to be enabled and to drive a particular data state onto the bus. T2 then represents the period of time during which data may be sampled from the bus by one or more receiving nodes. This period may be longer or shorter than the illustrated period-depending upon the particular parameters of the operating computer system. T3 represents the time required for the first driver to be disabled. T4 begins after T3 ends and represents the time required for a subsequent driver to be enabled and to drive data onto the bus for sampling by receiver nodes. A subsequent sampling period T5 may begin in the technique illustrated by FIG. 2 only after the end of the period labelled T4. No data sampling may occur during the periods T1 and T3 and T4. During these periods the data on the bus is indeterminate. It should be noted that the time periods T1 through T5 are intended to be only visual representations of appropriate time periods, are not drawn to scale and may in practice be longer or shorter than illustrated.

Figure 3:
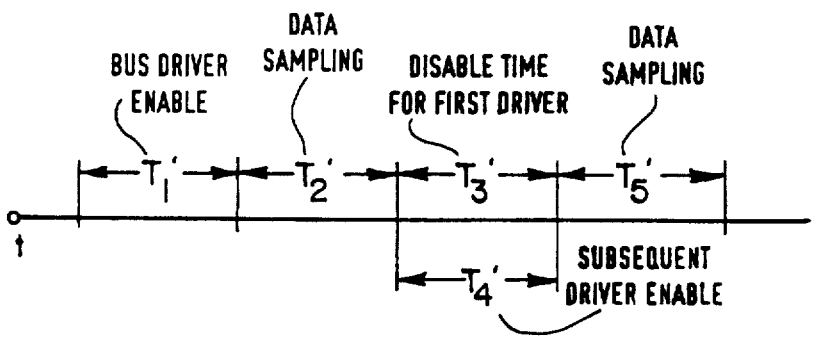
FIG. 3 illustrates the timing associated with a second data bus control technique using open terminal drivers.

Referring now to FIG. 3, therein is shown a timing diagram similar to that of FIG. 2, except that the diagram of FIG. 3 illustrates a data transaction for a data bus associated with open terminal drivers. Again, time is shown on the horizontal axis and advances from left to right. T1' corresponds to the period T1 on FIG. 2 and represents the time required for a first bus driver to enable and drive data onto the bus. T2' corresponds to T2 from FIG. 2 and represents the time during which data may be sampled from the bus. T3' correspondingly represents the time required for the first driver to disable, while T4' represents the time required for a second, succeeding driver to enable and to drive data onto the bus. T3' and T4' may overlap as illustrated, because open terminal drivers are being used, and no dangerous conditions are created by allowing two or more open terminal drivers to be enabled with respect to the bus simultaneously. However, the data on the bus is indeterminate during this period. The data driven onto the bus by the second driver during the period T4' may then be sampled during the subsequent period T5'. Again, it should be noted that the time periods T1' through T5' are intended to be only visual representations of such time periods and may in practice be longer or shorter than illustrated.

From a review of the timing diagrams of FIGS. 2 and 3, it can be seen that data may be sampled from the bus during a relatively small fraction of the system operating time. Those periods denoted by T1, T1', T3, T3', T4 and T4' represent time periods for which the bus must be inactive, thereby limiting data bandwidth for the computer system.

Figure 4:
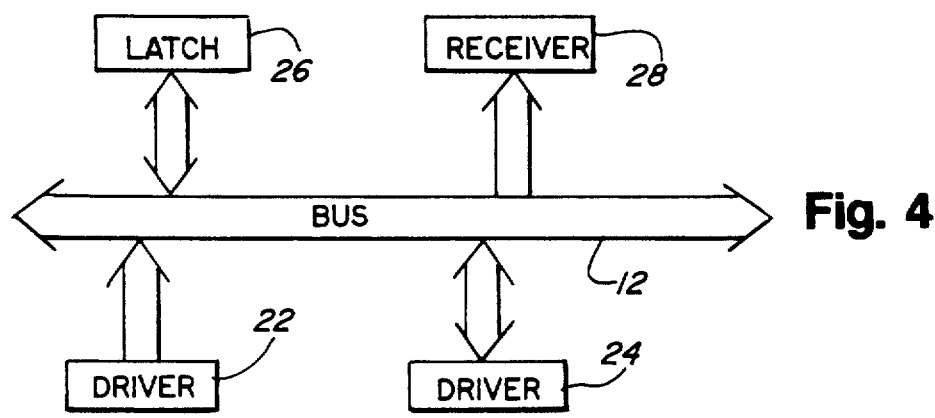
FIG. 4 illustrates a general schematic representation of a preferred embodiment of the present invention.

The present invention overcomes much of this inactive time through the implementation of a bus control system such as that shown in FIG. 4. Therein, the bus 12 receives data from drivers 22 and 24. For the sake of illustration only two drivers are shown but it is within the scope of the invention that m fewer driver means would be used. In addition, the drivers 22 and 24 are intended to include a transmit only node or a transceiver node, i.e., a node that both transmits and receives. Once the bus has been driven to a particular data state by one of the drivers 22 or 24, a latch circuit 26 latches that data state onto the bus 12 until a different data state is subsequently driven onto the bus 12 by that driver or a different driver. The data which is latched on the bus 12 is sampled by receiver 28 or by one of the drivers 22 or 24 functioning as a receiver. For example, if the driver 22 drives the bus 12 to a first data state, the latch circuit 26 maintains that data state on the bus 12 until the driver 22 or the driver 24 drives the bus to a different data state. The latch circuit 26 maintains the current data state on the bus regardless of the termination of the active drive by the driver node that originally drove that data state onto the bus.

Figure 5:
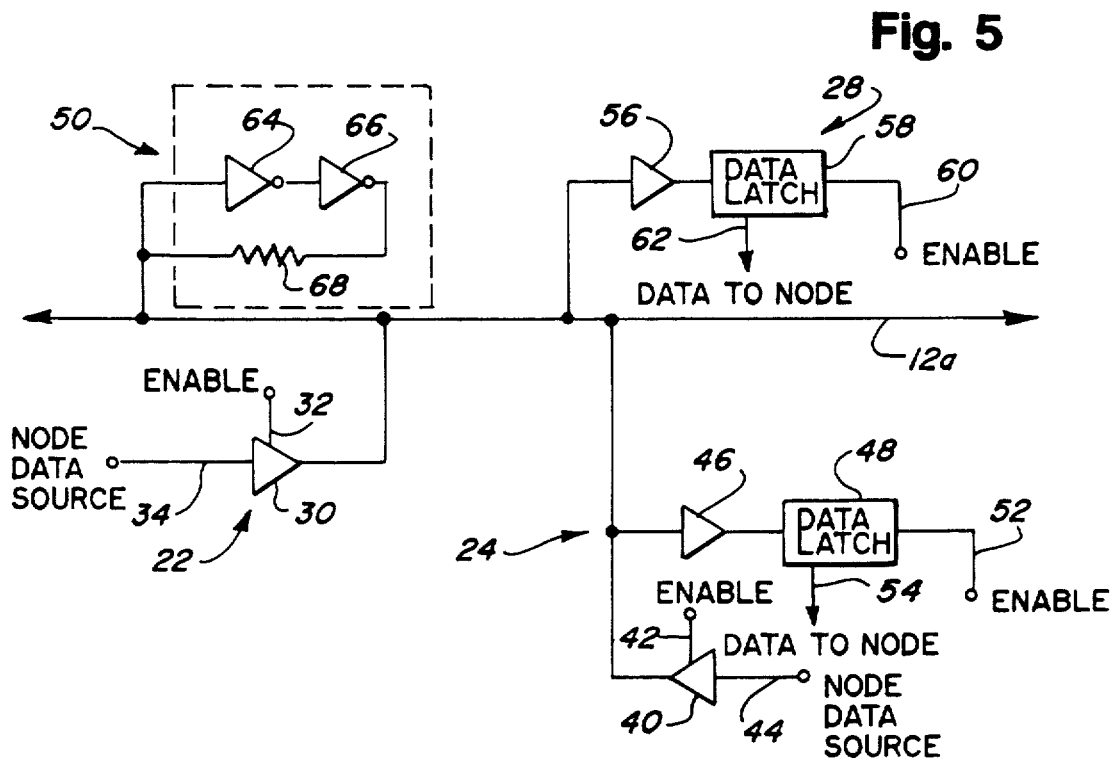
FIG. 5 illustrates a more specific schematic representation of a computer system in accordance with the teachings of the present invention.

Referring now to FIG. 5, therein is shown a more specific schematic of a computer bus control system according to a preferred embodiment of the present invention. In FIG. 5, the driver 22 is shown as a transmit only node and driver 24 is shown as a transceiver node. The drivers 24 are shown as being connected to only one line 12a of the bus 12, while in practice each would be connected to each line of bus 12. The latch circuit 26 is shown in more detail, although only for use with a single bus line 12a. In practice, the latch circuit 26 comprises a plurality of latch circuits 50 each connected to one of the multiple lines of the bus 12. The receiver 28 is also shown in more detail and connected to only one line 12a of the bus 12, while in practice it would be connected to each of bus 12. It is within the scope of the invention that other forms of drivers, receivers and latch circuits could be used. The driver 22 comprises a drive amplifier 30 which responds to an enable signal received on a line 32 to drive node data from a line 34 onto the bus line 12a. Similarly, the driver 24 comprises an amplifier 40 which responds to an enable signal received on a line 42 to drive node data from a line 44 onto the bus line 12a. In addition driver 24 comprises an amplifier 46 which receives data from line 12a and is connected to data latch circuit 48. The data latch circuit 48 responds to a latch enable signal received on a line 52 to sample data from the bus line 12a and transfer that data to the node on a line 54. The receiver 28 comprises an amplifier 56 connected to the bus line 12a. The amplifier 56 is coupled to a latch circuit 58 which responds to a latch enable signal on a line 60 to sample data from the bus line 12a and transfer that data to the node on line 62. The latch circuit 26 comprises a plurality of latch circuits 50, one of which is illustrated in FIG. 5. Each latch circuit 50 comprises a pair of inverters 64 and 66 and a feedback resistance 68. It is also within the scope of this invention to use other circuits in place of the pair of inverters such as a noninverting amplifier. The input of the latch circuit 50 is connected to the bus line 12a.

In operation, one of the drive amplifiers 30 and 40, determined by which receives an enable signal, drives the bus line 12a to a particular state. In the preferred embodiment, the drivers are tri-state drivers. The act of driving the bus line 12a to a selected state activates the latch circuit 50 to hold that data state on the bus after the driving action terminates. The latch circuit 50 then holds the data state on the line 12a until a subsequent enable signal turns on another driver node amplifier, either amplifier 30 or amplifier 40 in FIG. 5. Once that occurs, the holding action of the latch circuit 50 is overridden by the driving action of the node driver and the bus assumes the new state. However, the latch 26 then holds that data state on the bus until a subsequent driving action by another node driver. In this implementation, data may be sampled, by either driver means 24 functioning as a receiver or receiver means 28, from the bus at any time after active drive by one of the nodes.

Figure 6:
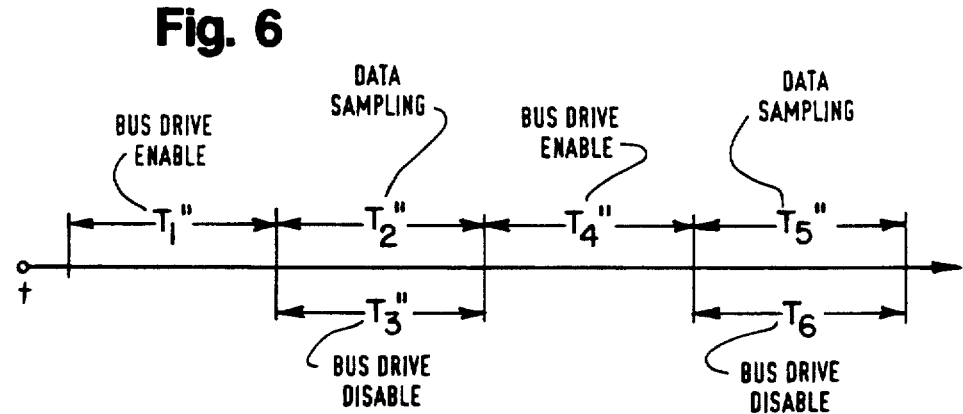
FIG. 6 illustrates the timing associated with implementation of the preferred embodiment of the present invention in a computer system such as that of FIG. 1.

The timing associated with the operation of a computer system according to the preferred embodiment of the present invention is illustrated in FIG. 6. Once again, time is shown on the horizontal axis, advancing from left to right. The first period illustrated, T1", represents the period required for the first driver node to be enabled in response to an enable signal and to drive the data bus line to a desired data state. The second period, T2", represents the ensuing time period during which the data may be sampled from the data bus. This period overlaps with the period T3" which represents the time required for the first driver to be disabled and removed from active communication with the bus. The latch maintains the integrity of the data state on the bus during this period.

Although shown as being identical in duration, the periods T2" and T3" need not be identical. The illustrated example represents merely the ideal operating circumstance, i.e., that data sampling will be complete by the time a preceding driver has been fully disabled. After the first driver is effectively removed from active communication with the bus, represented by the end of the period T3", new data may be driven onto the bus from another (or the same) driver node. The illustrated interval T4" represents the time required for the next driver to be enabled in response to an enable signal and drive the data bus to a new data state. T5" then represents the interval during which this new data state may be sampled by receiver nodes from the data bus. Another interval is shown as corresponding to T5". This interval, T6, represents the time required for the second driver to be disabled and removed from active communication with the bus. Again, it should be noted that the time period T1' through T6 are intended to be only visual representations of appropriate time periods, are not drawn to scale and may in practice be larger or shorter than illustrated.

As shown by the timing diagram of FIG. 6, the present invention allows the use of more power efficient tri-state drivers while optimizing data bus utilization. The only time data cannot be sampled from the bus in the preferred embodiment occurs while a driver is being enabled and actively driving data onto the bus, e.g., T1" and T4". Once the data state is driven onto the bus, it may be sampled at any time e.g., T2" and T5", because of the sustaining action of the latch circuit, until a subsequent data state is driven onto the bus by a driver node.

In the preferred embodiment, the feedback latch circuit 50 has a relatively weak drive compared to the node drivers since the latch circuit 50 is only required to maintain the level of the primarily driven data, as opposed to being required to create fast signal transitions. Also, the resistance 68 may be either a discrete resister or may be simply the inherent output impedance of the second invertor 66. The actual value of the resistance can fall anywhere between a maximum determined by the DC loading of the bus and the need to maintain valid logic states between drives and a minimum value just sufficiently high that the drivers can overcome the latch. Generally, the resistance value represents some mean value between the output impedance of the drivers and the sum of the input impedances for the various receiver nodes (typically for 8–10 receiver nodes, but conceivably for as many as 40 or more) associated with the bus. In TTL logic systems, this ratio is about 100:1, whereas in CMOS systems, this ratio is about 10,000:1. Thus for ease of use, operation and construction and for optimal signal processing, the preferred embodiment contemplates the use of CMOS circuitry. Correspondingly, the latch comprises two CMOS inverters 64 and 66 constructed as an ideal driver.

The foregoing description of a preferred embodiment should be taken as a non-limiting example of one implementation of the present invention. The invention itself is set forth in the following claims. The claims should be deemed to encompass at least the specific embodiments disclosed above, as well as such modifications and alterations as would be apparent to one of ordinary skill in the computer art and familiar with the teachings of this application. The appropriate scope of the invention may be measured by the claims in view of the foregoing description and the relevant prior art.

What is claimed is:

1. A data bus control system for computer system communication, said data bus control system comprising:
   bus means for communicating data;
   first driver means, coupled to said bus means, for driving data onto said bus means;
   second driver means, coupled to said bus means, for driving data onto said bus means;
   latch means, coupled to said bus means, in response only to one of said first driver means and second driver means driving data onto said bus means, for immediately receiving and latching said data on said bus means independent of any other timing event in said bus control system wherein only one of said first driver means and second driver means drives data onto said bus means at any one time, said latch means maintaining said latched data on said bus means to continue the availability of said latched data on said bus means until one of said first driver means and said second driver means drives new data onto said bus means; and,
   receiver means, coupled to said bus means, for sampling said latched data present on said bus means, at any time before one of said first driver means and said second driver means drives new data on said bus means.

2. A method for controlling data transfer in a computer system having a bus means for communicating data, a plurality of driver means each coupled to said bus means, latching means coupled to said bus means and receiver means coupled to said bus means, said method comprising the steps of:
   enabling one of said plurality of driver means to drive a desired data state onto said bus means;
   driving a desired data state onto said bus means for transfer;
   receiving said desired data state driven onto said bus means and latching said desired data state on said bus means by said latching means only in response to one of said plurality of driver means driving said desired data state onto said bus means and independent of any other timing event in said computer system;
   disabling said one of said plurality of driver means driving said desired data state onto said bus means after said desired data state is latched on said bus means;
   maintaining said latched desired data state on said bus means to continue the availability of said desired data state on said bus means until one of said plurality of driver means is enabled and drives a new desired data state onto said bus means;
   sampling with said receiver means said desired data state present on said bus means at any time after said latching of said desired data state on said bus means and before one of said plurality of driver means is enabled and drives a new desired data state onto said bus means;
   enabling one of said plurality of driver means to drive a new desired data state onto said bus means; and
   driving a new desired data state onto said bus means for transfer.

3. A method for controlling data transfer in a computer system having a bus means for communicating data, a plurality of tri-state drivers each coupled to said bus means, latching means coupled to said bus means and receiver means coupled to said bus means, said method comprising the steps of:
   enabling one of said plurality of tri-state drivers to drive a desired data state onto said bus means;
   driving said desired data state onto said bus means;
   latching with said latching means said desired data state on said bus means responsive to said driving of said desired data state onto said bus means by said one of said plurality of tri-state drivers and independent of any other timing event in said computer system maintaining the availability of said desired data state on said bus means by said latching means;
   disabling said tri-state driver from driving said desired data state onto said bus means;
   enabling another one of said plurality of tri-state drivers to drive a new desired data state onto said bus means;
   driving said new desired data state onto said bus means;
   sampling said desired data state from said bus means at any time before driving said new desired data state onto said bus means;
   latching said new desired data state on said bus means responsive to said driving of said new desired data state onto said bus means and independent of any other timing event in said computer system maintaining the availability of said new desired data state on said bus means by said latching means;
   disabling said another one of said plurality of tri-state drivers from driving data onto said bus means; and,
   sampling said new desired data state from said bus means after said latching of said new desired data state on said bus means.

* * * * *